United States Patent [19]

Bucking

[11] 4,005,162

[45] Jan. 25, 1977

[54] PROCESS FOR THE CONTINUOUS PRODUCTION OF PARTICLE BOARD

[75] Inventor: Gunter Bucking, Springe, Deister, Germany

[73] Assignee: Bison-werke Bahre & Greten GmbH & Co. KG, Germany

[22] Filed: Jan. 20, 1975

[21] Appl. No.: 542,292

[30] Foreign Application Priority Data

Jan. 18, 1974 Germany .......................... 2402410

Apr. 22, 1974 Germany .......................... 2419320

[52] U.S. Cl. .................................. 264/25; 264/122

[51] Int. Cl.$^2$ .......................................... B29D 27/00

[58] Field of Search ............. 264/109, 122, 125, 25

[56] References Cited

UNITED STATES PATENTS

| | | | |
|---|---|---|---|
| 2,363,480 | 11/1944 | Brownlee | 264/109 |
| 3,194,856 | 7/1965 | Palmer | 264/122 |
| 3,880,975 | 4/1975 | Lundmark | 264/122 |

*Primary Examiner*—Robert F. White

*Assistant Examiner*—James R. Hall

*Attorney, Agent, or Firm*—Craig & Antonelli

[57] ABSTRACT

Process and apparatus for the continuous production of chipboards, fibreboards, or the like from lignocellulose containing particles mixed with binders, which particles are strewed onto an endless conveyor belt forming a mat or fleece, which mat is subsequently introduced into a press and compressed therein to a panel sheet under the effect of heat during which period the binder hardens, characterized by heating apparatus for heating the upper cover layer of the mat before the mat enters the feeding zone of the press. Preferred apparatus for heating the upper cover layer of the mat includes indirect radiant heat supplying devices such as infra-red lamps. The preferred temperature range to which the upper mat cover layer is heated is 30° to 50° C.

7 Claims, 2 Drawing Figures

PROCESS FOR THE CONTINUOUS PRODUCTION OF PARTICLE BOARD

BACKGROUND AND SUMMARY OF THE INVENTION

Figure 1:
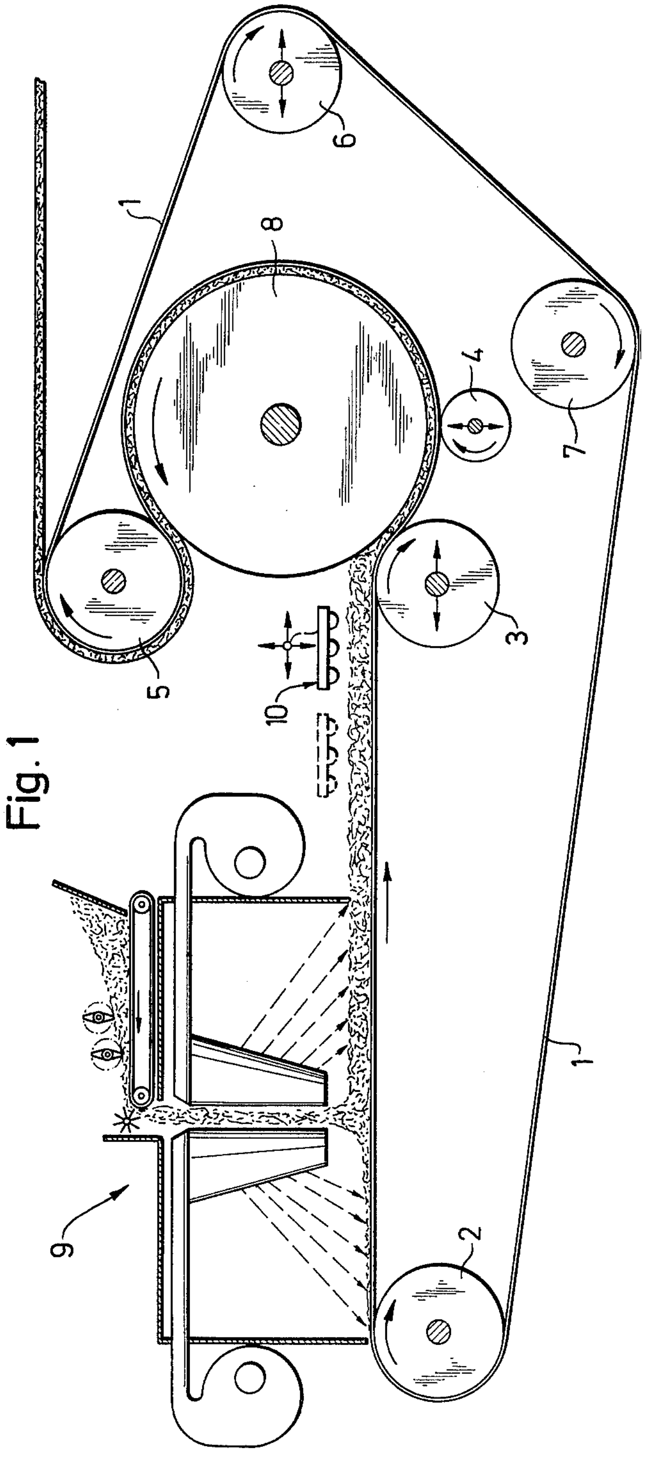

This invention relates to a process for the continuous production of chipboard, fibreboard or the like (i.e. particle board) such as from wood cellulose containing particles mixed with binding agents, which particles, when spread on an endless conveyor belt, form a layer which is subsequently introduced into a press and therein compressed under the action of heat whereby the binding agent hardens to make a strip of board. Processes of this kind are known (see German Patent Specification No. 2,126,935, or German Offenlegungsschrift 2,205,575).

Spreading the wood cellulose containing particles mixed with binding agents on to an endless conveyor belt may be effected according to the projection or air-sifting principle. Particularly as a result of the air-sifting spreading of such particles, a layer is formed which has a high content of fine particles and dust in its surface. This is one of the most important prerequisites for producing boards with smooth and non-porous surfaces in a continuous process, which do not require polishing. During continuous operation of the process, it has now been ascertained that in places at least, the upper fine surface covering of the layer is blown away or out, at the entry to the press, when the endless conveyor belt on which the continuous layer is placed attains a certain speed of advance, determined by the throughput capacity required.

The speed of advance of the endless conveyor belt and thus the speed of the press is, for example, approximately 16m/min for producing a strip of board 3mm thick. However, as a result of the blow away or blow-out effect, which is disadvantageous with respect to the distribution of density in the layer and the relatively high throughput capacity required, an inferior strip of board is obtained, which has objectionably a varying gross density distribution, in addition to a non-uniform surface structure. Also, a strip of board approximately 3mm thick is practically impossible to polish to an economically significant specific size. On the other hand polishing thicker strips of board or individual boards likewise has a detrimental effect on the economical application of such processes.

It is therefore desirable to further develop processes for the continuous production of chipboard, fibreboard or the like, (i.e. particle boards) so that the above-mentioned blow-away or blow-out effect, with all its indicated consequences, is reduced as much as possible.

It has been proposed to reduce the proportion of fine particles and dust in the layer which is to be spread, in order to counteract the blow-away or blow-out effect in the entry area of the press. However, an asymmetrical layer construction results therefrom, together with the danger that the quality of the surface of the strip of board may turn out to be unsatisfactory. It has also been proposed to keep the humidity of the layer passing into the entry area of the press fairly high. This measure for avoiding the disadvantageous blow-away or blow-out effect leads to longer compression times. It would of course also be possible to pass the layer into the entry area of the press at a relatively lower rate of advance. However, this would result in such a low throughput capacity that the economic feasibility would become doubtful.

Viewed from one aspect the invention provides a process for the continuous production of chipboard, fibreboard or the like (i.e. particle board) from wood cellulose containing particles mixed with binding agents, wherein the particles are spread on an endless conveyor belt to form a layer which is subsequently introduced into a press and compressed therein under the action of heat, whereby the binding agent hardens, to form a strip of board, including the step of applying heat to the upper covering of the layer before it reaches the entry area of the press.

Viewed from another aspect the invention provides apparatus for carrying out the process as set out above, comprising means for forming a layer of wood cellulose containing particles mixed with binding agents on an endless conveyor belt, a press for compressing under the action of heat a layer introduced therein by the conveyor belt to form a strip of board, and a heating device for heating the upper covering of the layer prior to the entry thereof into the press.

It has been found that only relatively little heating of the upper covering of the layer is required. For example, heating by indirect radiant heat up to approximately 30°–50° C has been found to be adequate. It is thought that a sweating effect is thus brought about in the upper covering of the layer. Drifts or eddies of air and fine particles — up to dust — in the layer may thus be prevented, so that the layer can enter the press with an overall uniform thickness.

Boards manufactured according to the invention, which may be from approximately 1.6 to about 30mm thick, have not only an improved gross density distribution in the transverse and longitudinal directions, but also an advantageously small thickness tolerance, for example ± 0.1 to 0.2 mm. Their surfaces are, moreover, substantially smooth and non-porous. This makes further treatment by polishing unnecessary. The technical and economical advantages of the invention may also be seen in the fact that the endless conveyor belt on which the layer is formed, can be driven at considerably high speeds of advance, whereby increased pressing speeds may be attained. The following performance data, based on fairly thin boards, have been obtained in experiments.

| Thickness of board in mm | Conveyor belt/pressing speed in m/min |
|---|---|
| 3.0 | 15–20 |
| 3.2 | over 14 |
| 4.2 | over 10.7 |
| 4.8 | over 9.4 |
| 5.6 | over 8 |
| 6.3 | 7 to about 9 |

Figure 2:
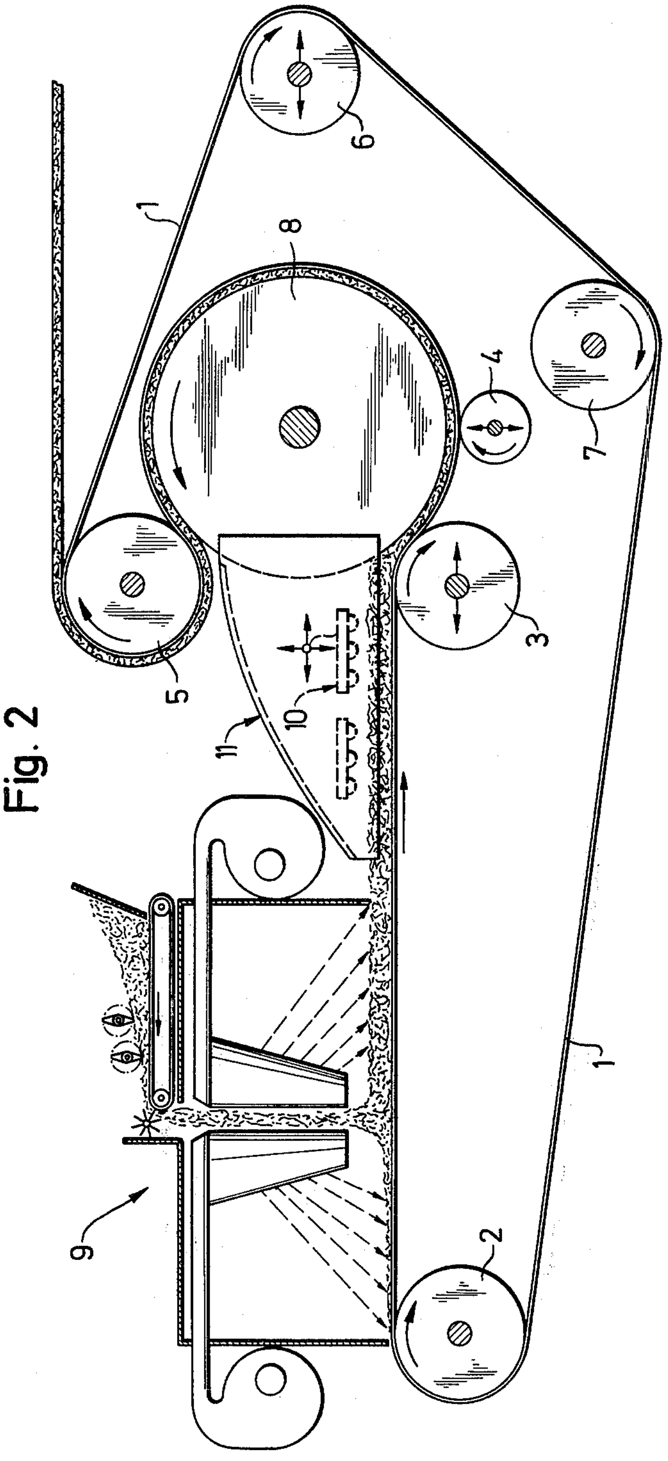

Two embodiments of the invention will now be described by way of example and with reference to the accompanying drawings, in which:

FIG. 1 shows a side view of a continuous-operation chipboard press, provided with a radiant heat device; and FIG. 2 shows the press of FIG. 1 with a cowling covering the radiant heat device.

Referring now to the drawings, endless steel belt 1, which serves as a conveyor belt for a layer is passed via guiding and feed rollers 2, 3, 4, 5, 6 and 7 around a heated pressing drum 8 in such a way that the layer, deposited on the conveyor belt 1 by means of a layer-forming station 9 working on the air-sifting principle, may be withdrawn, in its finished, compressed state, downstream of the roller 5. Between the layer-forming station 9 and the pressing drum 8 is provided a radiant heat device 10 (preferably comprising infra-red lamps) which serves to heat only the upper covering of the layer. This radiant heat device is adjustable, in both the horizontal and vertical directions, in order to permit one, by trial and error, to ascertain in which position the radiant heat device is best disposed.

In FIG. 2 there is shown, between the layer forming station 9 and the press a cowling 11 closing off the entry area of the press at the sides and top, which cowling houses the radiant heat device, and serves to reduce or conserve the amount of heat supplied by the radiant heat device.

While I have shown and described several embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

Copending commonly assigned U.S. patent application Ser. No. 413,424, filed Nov. 7, 1973 now U.S. Pat. No. 3,879,185 is incorporated by reference herein insofar as it relates to background disclosure of air-sifting or spreading devices of the type discussed in this application.

I claim:

1. In a process for continuously producing particle board in which (a) wood cellulose-containing particles are mixed with a binding agent, (b) the mixture so obtained is spread onto an endless conveyor belt to form a layer having a high content of fines and dust of said wood cellulose-containing particles at least on an upper surface thereof, (c) the layer so formed is moved into a press at a speed causing at least some of the fines and dust on the upper surface of said layer to be blown away from said layer, and (d) the layer is then compressed in said press under the influence of heat so that said binding agent is hardened and said particle board is thereby formed, the improvement wherein prior to entry of said layer into said press the upper surface of said layer is heated in such a manner that blowing off of fines and dust from said layer as said layer moves into said press is prevented.

2. The process of claim 1, wherein the upper surface of said layer is heated to a temperature of about 30° to 50° C by means of indirect radiant heating.

3. The process of claim 1, wherein the upper surface of said layer is heated by means of radiant heating.

4. In a process for continuously producing particle board in which (a) wood cellulose-containing particles are mixed with a binding agent, (b) the mixture so obtained is spread by air sifting onto an endless conveyor belt to form a layer having a high content of fines and dust of said wood cellulose-containing particles on an upper surface thereof, (c) the layer so formed is moved into a press at a speed causing at least some of the fines and dust on the upper surface of said layer to be blown away from said layer, and (d) the layer is then compressed in said press under the influence of heat so that said binding agent is hardened and said particle board is thereby formed, the improvement wherein prior to entry of said layer into said press, the upper surface of said layer is heated in such a manner that blowing off of fines and dust from said layer as said layer moves into said press is prevented.

5. The process of claim 4, wherein the upper surface of said layer is heated by means of radiant heating.

6. The process of claim 5, wherein said upper surface is heated to a temperature of about 30° to 50° C.

7. The process of claim 4, wherein said upper surface is heated to a temperature of about 30° to 50° C.

* * * * *